United States Patent Office 2,821,478
Patented Jan. 28, 1958

2,821,478

FOOD COMPOSITION CONTAINING COMMINUTED JELL PARTICLES AND METHOD OF MANUFACTURE

John H. Forkner, Fresno, Calif., assignor to Pillsbury Mills, Inc., Minneapolis, Minn., a corporation of Delaware No Drawing. Application December 21, 1955
Serial No. 554,603

7 Claims. (Cl. 99—129)

This invention relates to a dry, pulverulent food composition containing comminuted particles of substance capable of jelling, and to a process of making such food composition.

Jelled food particles in commercial use are commonly called gum drops, fruit slices or sliced jelled squares. A particle of this nature may be defined as a molded semi-transparent easily melted food preparation which has a soft and somewhat elastic homogeneous consistency owing to the presence, with granulated and corn sugar and water, of the common jelling agents as gelatine, pectins, gum tragacanth, gum arabic, agar agar, Irish moss and starch; some of the foregoing agents requiring conversion by boiling in the presence of an acid.

The present invention is concerned with that class of jelled food particles commercially made by confectioners. In the manufacture of jelled candies and the like, there are two common methods employed. In one method, the jelling material is deposited in impressions molded in starch wherein the individual jell products are retained until they have cured. The other common method of forming such jelled confections consists in depositing a sheet of jelling substance on a cooling slab following which it is permitted to cool and set. The material is then generally cured in squares or slices. Deviations in the foregoing will be familiar to skilled confectioners. In the starch cast process, a moisture content of from 22% to 24% is generally requisite because of limitations in the depositing equipment. After depositing the gum drop in the starch molds, which, in turn, are formed upon trays, these trays are placed in warm rooms and a setting and drying action occurs over an indefinite period of time. The overall effect is termed "curing" and is dependent upon formulation, time of standing, heat, humidity and circulation of surrounding air. Because of the fabrication of starch molds, the handling of trays and the necessity for individual filling of each, the high ratio of starch to yield of gum drop product, there is a practical limitation to the size of the conventional gum drop that can be economically produced. The smallest gum drop in commercial production of which I am aware will be retained upon a 3 mesh screen. For my purpose, hereinafter disclosed, jell particles of the smallest commercial size mentioned above are larger than I desire to use. In practicing my invention, I have been able to produce and utilize large quantities of relatively small pieces of jelled material in an economical manner. By small pieces, I particularly am desirous of producing a range from one to forty thousand pieces per pound with a preferential range of around twenty thousand pieces per pound.

In the manufacture of commercial gum drops, the pieces, when packaged, have achieved a firmness just sufficient to retain their identity in the package. The manufacturer frequently relies on storing and shipping time as a favorable feature in the final curing and firming of the product. Retaining the entire production in storage to such time as will completely cure the product is impractical because extensive production capacities of this type of operation result in excessive storage requirements. If an attempt is made by the present manufacturers of gum drops to further subdivide them into small particles of the character which I require, they experience difficulty because the particles ordinarily will not have set and cured to a point which will permit ready chopping or slicing without sticking to the equipment employed and without agglomerating thereafter.

It is within the contemplation of the present invention to eliminate several of the basic conventional steps of the processing presently employed in the gum drop art as disclosed in my copending application Ser. No. 554,604, filed December 21, 1955, entitled "Food Composition Containing Jell Particles and Method of Manufacture" and further to employ means of subdividing jell particles at the time of admixing in a food composition or prior thereto. In a particular commercial application of my invention, I manufacture a cake premix containing food particles which will be evidenced in a baked cake made from the premix.

A manufacturer of cake premixes may be called upon to manufacture several carloads of such premixes each day, and in a variety of different flavors and recipes. The herein-disclosed invention may be utilized in such premixes to implement the standard dry ingredients with discrete particles of jelled property so that the ultimate consumer can make therefrom a cake selected from a variety of premixes having a multiplicity of colors and flavors, although the general formulation of the cake mix proper may be restricted to a relatively few types.

In the manufacture of my jell component, I prefer to use a vacuum concentrating kettle to achieve a high concentrate of product with rapid operation. I utilize standard practice well known to the confectioner's art in boiling my jell ingredients and, after the acidification of the boiled jell material, if such is required, I then concentrate the mass of material to around 82% solids. It is within the contemplation of my invention to incorporate any of a multiplicity of flavors or colors in the fluid product obtained by the foregoing and may utilize such product directly as set forth below or may temporarily store the product in a heated retaining kettle until such time as I require the jell material to be further processed.

The fluid jelling material is then deposited in a form suitable for further processing and in a manner well known to ordinary starch casting in the confectioner's art, but not dependent upon a uniformly molded piece as is generally required by the confectioner. On the other hand, I may extrude or deposit, by several types of equipment, pieces, strips, chunks, sheets or the like onto a surface which has been dusted or covered to desired depth with a dry carrying medium. The dry carrying medium may be a component of the total premix such as sugar or flour or may be the total dry premix already fabricated and fed in relative proportion to the desired amount of jell material. For purposes herein disclosed I may utilize only a portion of the premix or component at this point, but, in such event, will ultimately adjust the total proportions of ingredients subsequent to the incorporation of jell particles and prior to the packaging of the premix. Conventional apparatus such as batch trays or preferably a conveyor belt, may be employed for effecting the depositing and proportioning above noted. The jell material thus deposited may be further processed or may be partially pre-cured while remaining in this deposited condition and at a moderate temperature of, for example, 60° Fahrenheit. The step of pre-curing is not essential to the success of my process but may aid in firming the final particles and in minimizing any tendency for the particles to bleed and to be moist or discolor the surrounding mix prior to ultimate curing.

The next step in my process is to chill the deposited jell in uncured or partially cured condition together with its carrier medium to a degree where it is firm enough or in such brittle condition as either to be cut or cracked. I have usefully and successfully employed a conventional hammer mill for this purpose wherein the hammers are provided with cutting or knife members to provide a slicing impact. I have found that there is no particular temperature which must be employed to achieve the end result desired, but that the physical state of the jell be changed as above described to best carry out the subdividing of the jell product in the manner described. For example, if the ratio of jell material to premix be less prior to the milling step, then the chilling requirement can be modified since the additional dry premix carrier acts as a diluent and expanding medium even at somewhat warmer temperatures. It is, of course, understood that the additional premix material or component thereof would not be so warm as to appreciably raise the temperature of the entire carrying medium.

Following the subdivision or comminution of the jell material, it is important that the carrying medium, as well as the jell particles themselves, be maintained at low temperature during handling and at least prior to the ultimate packaging thereof. I find that it may be necessary to remix the carrying medium of dry pulverulent material together with the comminuted and chilled jell fragments because there may have been non-uniform feeding resulting in concentration of jell substance with respect to a body of the dry material. However, since the jell particles are chilled to the point of firmness and non-stickiness, such handling as agitation or mixing can be accomplished without harm on a vibrating screen, screw conveyor, or conventional blender to thoroughly distribute and disperse the particles throughout. It is presumed that before such remixing of the chilled jell fragments or particles is carried out, such adjustment of proportions of the mix to jell particles as may be desired will have been previously made.

It is intended that the mixed product in its cool condition be transferred to a container or package within which it will stand undisturbed for a period of time following such transfer. To this end, I particularly prefer that the mixed product be weighed and fed through automatic packaging equipment directly to the consumer package. A plurality of such packages may then be cartoned, stored, conveyed or stacked, still retaining the relative locations of the individual jell particles with the pulverulent mass of premix substance. After such packaging, the entire package, including the premix and jell fragments or particles, are permitted to warm at least to atmospheric conditions and such may be accomplished by heat, allowing to stand, or controlling the rate of defrosting so as to accomplish the same over a period of time sufficient to inhibit the sweating of particles or of the packages themselves as a result of defrosting.

An important feature of my invention is utilization of the storing and shipping time prior to purchase of the packaged premix by the ultimate consumer for the purpose of completing to a desired degree the curing or dehydrating of the previously uncured or partially cured particles of jell substance. The curing or dehydrating of the particles is requisite to proper functioning of the premix when it is utilized as a food product by the ultimate consumer. Complete curing, however, is not essential to the packaging, storing and shipping as I have previously set forth and I have thus been able to minimize the storage and handling problems in large scale production completing the processing of my food composition after the packaging step. The jell particles at the time of utilizing the premix thus will have a firm consistency that will permit each particle to maintain its integrity when the premix is moistened and even when the premix is utilized for baking a food product. In certain instances where it is required that the food premix be boiled in water, the cured jell fragments or particles will have become firm enough so that the consumer may separate by screening action the jell particles from the remainder of the premix composition. The premix may then be boiled as required and the jelled particles reincorporated with the boiled portion at a later stage during or after cooling. Such procedure is exemplified by the cooking of gelatin desserts, pectinized products, icings and so forth where it is desirable to separate the jelled particles and reincorporate them later to preserve their identity.

In some instances I may practice the present invention utilizing a jell material such as starch cast gum drops which have been cured and dehydrated so as to be firm enough to retain their identity even in small sizes, although not so lacking in stickiness as to preclude agglomeration or poor flowing characteristics. This is important in connection with the practice of my invention since the particle size of the jell component which I desire to achieve lies between a 3 mesh and 16 mesh U. S. standard sieve size, which size results in a product ranging from twenty to thirty thousand pieces per pound. By chilling the conventional gum drop material and comminuting such material while placed in a carrying medium of dry pulverulent material such as the above mentioned premix or component thereof, I can accomplish the subdivision and dispersion of jelled particles in a manner similar to that previously described while precluding the comminuted gum drops from sticking to the mechanical subdividing equipment or from themselves agglomerating in the subdividing machinery and in the conveying, mixing, and packaging equipment as well. Where the conventional starch cast gum drop has been so employed in subdivided condition it should be pointed out that the premix product will have utilization as a consumer product immediately or in a much shorter period of time than is required where the initial jell material has been uncured or cured to a lesser extent. On the other hand, the preliminary manufacture and treatment of the conventional gum drop prior to using of my process is more expensive. In any event, the food composition results in a novel ultimate product having pleasing appearance and taste so as to lend variety to the general classes of foods fabricated according to my invention.

Also comprehended within the present disclosure is a process for making a food composition wherein the dry pulverulent food element consists wholly or partly of plain sugar and the small jell particles may be actually retained in free-flowing condition for subsequent use such as incorporating into a premix product.

The initial steps are substantially the same when producing the free-flowing gumdrop product and I have found that this adaptation of the invention may be applied to conventional cured gumdrops or any jelled piece ranging from an uncured to a completely cured piece. In addition, I have found that fruit concentrate and the like may be fabricated in the presence of a jelling agent even where the relative proportions of solid to liquid are in the neighborhood of above 80%. The jell-producing material may be pre-chilled, or, in the case of partially cured or cured gumdrop material, may be sliced or otherwise comminuted and immediately deposited in sugar so as to maintain the particles in separate and non-sticking relation. Where the material is chilled to the point of becoming brittle, there is, of course, no possibility of the particles sticking so long as they are maintained in such chilled condition. The chilled jell pieces are then comminuted to the desired size and deposited in an excess of the aforementioned dry pulverulent food which, in the present instance, is sugar. It is important that the sugar be intermixed very thoroughly so that the jell particles are kept in separate condition. If the jell pieces are fairly well cured, it is possible for the surface moisture to be further absorbed by the sugar coating so as to render the jell pieces unlikely to agglomerate. It is preferred that the warming step of the process be achieved with the excess sugar and jell particles maintained in a mass to prevent frosting except at the very upper exposed surface of the mass. The warming can thus be accomplished by placing the jell particles and sugar into containers such as, for example, 40 pound drums which I have found to be useful for the purpose herein disclosed. If the humidity in the defrosting room is controlled, the problem of sweating, of course, is not serious.

The next step is to deposit the comminuted jell particles together with the excess sugar component into a dryer which will remove sufficient moisture from the jell particles and the sugar to render the jell particles free-flowing. It is recognized, however, that the sugar itself may cake to a greater or lesser degree and, hence, the product is not necessarily free-flowing, in its condition immediately following drying. I have found that a vacuum shelf dryer with a vacuum of 29 inches and operating at a temperature in the vicinity of 160 degrees Fahrenheit will reduce jell particles of a size which will pass a number 3 screen and stay on a number 16 screen in about four hours time, the initial moisture content being 20% and the final moisture content being 10% of the total weight of the jell product. It is understood, of course, that the specific example may be varied considerably since the figures given are relative to the formulation. For example, the higher the starch content or the greater the excess of sugar employed, the higher the moisture content may remain and still permit free-flowing characteristics to reside in the mass of jell particles.

As mentioned above, the jell particles themselves may acquire a free-flowing property, yet be imbedded in an agglomerated mass of sugar material. I have found that the agglomerated sugar may be easily and quickly broken up in a hammer mill (operating at a speed of 900 R. P. M. and a screen size of one-quarter inch mesh for the particle size above specified) and the loose sugar is then screened or scalped off the product. The remaining free-flowing jell particles will, of course, have some of the dry pulverulent sugar clinging to their outside surfaces and, in some instances, it may be desirable to leave a portion or all of the sugar as a dry pulverulent food-carrying medium for the jell particles. At any rate, once the particles have been dried and the sugar broken up, the product will remain free-flowing until moisture is again added to the product. The importance of so handling small jell particles in bulk to maintain them free-flowing arises from the factor of increased stickiness with reduction of particle size. I have found that numerous conventional jell pieces which will not stick together in unsugared surfaces in larger sizes, for example, one inch cubes or diameters will lose their non-sticking characteristics if reduced to a one-quarter inch size and the particles will then agglomerate. If further reduced in size, the stickiness factor is increased and, hence, the problem of handling small jell particles is acute.

In the latter adaptation of my invention, it is understood that the same objective is reached as in the previously disclosed adaptation, namely, to subdivide the pre-chilled jell particles and to deposit them in a dry pulverulent food mass following which the particles are permitted to dry and cure while maintaining them in free-flowing condition, the jell particles being of such a nature as would agglomerate in a hopeless mass if not treated in a manner such as disclosed herein.

What I claim is:

1. A food composition comprising a mass of dry pulverulent food material, and a plurality of discrete jell particles having a particle size a major portion of which lie between 3 mesh and 16 mesh; said particles and said pulverulent food material being chilled to a temperature below which said particles tend to agglomerate together.

2. An article of manufacture comprising a package, a predetermined mass of dry pulverulent food disposed in said package and substantially filling the same, and a plurality of discrete and normally sticky jell particles dispersed throughout said mass, said package, said mass of pulverulent food, and said particles all being chilled at the time of packaging to a temperature below that at which the particles tend to become sticky.

3. A process for the manufacture of a new food composition which consists in depositing a jell material upon a mass of dry pulverulent food material, chilling both the jell material and the dry pulverulent food material and firming the jell material, subdividing the chilled and firmed jell material and dispersing throughout said mass, and packaging the pulverulent material and the subdivided jell material while still in chilled condition.

4. A process for the manufacture of a new food composition which consists in depositing a quantity of jell-producing material upon a mass of dry food premix, chilling the jell-producing material and the premix to a temperature below that at which the jell-producing material is sticky in character, subdividing the chilled jell-producing material directly in the premix material, and uniformly dispersing the subdivided jell-producing substance throughout the premix, and packaging in chilled condition.

5. A process for the manufacture of a new food composition which consists in depositing a jell-producing substance upon a predetermined portion of pulverulent food premix, chilling the jell-producing substance together with the food premix to a temperature below that at which the jell-producing material will be sticky in character, incorporating additional food premix to establish a predetermined proportion of premix to jell-producing substance, subdividing the chilled jell-producing material in the presence of the premix, mixing the subdivided material uniformly throughout the premix and packaging while maintaining the mixture in chilled condition.

6. A process for the manufacture of a new food composition which consists in depositing a quantity of fluid jell material upon a pulverulent food material, permitting the fluid jell material to set, chilling the set jell material and the pulverulent food material to a temperature where the set jell material will not be sticky, forming the chilled material into small fragments directly in said pulverulent material, packaging the pulverulent material and chilled fragments, and warming the chilled jell material and pulverulent food material to a temperature where the jell particles again become sticky and permitting said particles to cure in situ.

7. A process for the manufacture of a new food composition which consists in depositing a quantity of jell-producing material upon a mass of sugar, chilling the jell-producing material and the sugar to a temperature at which the jell-producing material is brittle in character, defrosting and drying the comminuted material and cracking loose the particles to maintain a free-flowing condition.

References Cited in the file of this patent

UNITED STATES PATENTS

| | | |
|---|---|---|
| 1,949,657 | Preston | Mar. 6, 1934 |
| 2,097,143 | Campbell | Oct. 26, 1937 |
| 2,299,288 | Whymper | Oct. 20, 1942 |

FOREIGN PATENTS

| | | |
|---|---|---|
| 667,114 | Great Britain | Feb. 27, 1952 |